Dec. 17, 1963 J. C. RYAN Re. 25,498

CONTROL DEVICE FOR BRAKE-HOLDING MECHANISM

Original Filed Dec. 2, 1958 2 Sheets-Sheet 1

INVENTOR.
John C. Ryan.
BY Cushman, Darby & Cushman
ATTORNEYS

CONTROL DEVICE FOR BRAKE-HOLDING MECHANISM

Original Filed Dec. 2, 1958 2 Sheets-Sheet 2

INVENTOR.
John C. Ryan
BY Cushman, Darby & Cushman
ATTORNEYS

United States Patent Office

Re. 25,498
Reissued Dec. 17, 1963

25,498
CONTROL DEVICE FOR BRAKE-HOLDING MECHANISM

John C. Ryan, 6850 SW. 48th Terrace, Miami, Fla.

Original No. 2,966,565, dated Dec. 27, 1960, Ser. No. 777,630, Dec. 2, 1958. Application for reissue Aug. 30, 1962, Ser No. 220,585
17 Claims. (Cl. 200—82)

Matter enclosed in heavy brackets [ ] appears in the original patent but forms no part of this reissue specification; matter printed in italics indicates the additions made by reissue.

This invention relates to a control device, and more particularly, to a control device for use in a brake-holding mechanism of an automobile brake system.

In the prior art there are disclosed various brakeholders, particularly useful in motor vehicles of the type in which a fluid coupling is employed for transmitting power from the engine to the shaft for driving the wheels of the vehicle, for preventing creeping of the vehicle after being brought to a stop and the brake pedal has been released. These brakeholders commonly consist of a solenoid operated check valve interposed in the conduit between the master cylinder and the brake cylinders of a hydraulic brake system, which valve when closed prevents hydraulic fluid to return from the brake cylinders to the master cylinder and thus holds the brakes applied. In the brakeholders of the prior art, however, the various devices which have been proposed for automatically operating the solenoid operated valve have various undesirable features, especially in failing to automatically operate the check valve without interfering with or hindering the general operation of the vehicle.

It is therefore the primary purpose of the present invention to provide a novel control device for automatically and effectively operating a solenoid operated check valve commonly employed in a hydraulic brake system for preventing return flow from the brake cylinders to the master cylinder after the brakes have been applied and the vehicle has been brought to a stop, and to maintain the brakes applied until automatically released by a switch operated by the accelerator pedal commonly employed in motor vehicles.

It is further the purpose of the present invention to provide a novel control device for automatically operating the check valve of a brakeholder, which control device is responsive to the operation of the cable of the speedometer of a vehicle and which is operable only when the engine of the vehicle is idling, thereby preventing applied pressure to the brakes of the vehicles to be maintained for long periods of time, as when the vehicle is parked, and therefore to cause the hydraulic brake system of the vehicle to be damaged.

It is still further the purpose of the present invention to provide a novel control device for automatically operating the brakeholder of a hydraulic brake system of a motor vehicle without interfering with or hindering the general operation of the vehicle, which control device is not operable and is not noticeable in the operation of the vehicle in any way until the motion of the vehicle has completely stopped, and which control device is of simple and rugged construction, easy to install on the braking system of a motor vehicle without necessitating any major changes in the system, and which is very dependable in operation.

A control device constructed in accordance with the present invention comprises a body having fluid passages adapted to be connected at inlet ports thereof to a fluid pressure source and at outlet ports thereof to fluid-pressure operated motors. A control valve and an exhaust valve mounted for rotation in the body are arranged to control fluid pressure from the fluid pressure source to the motors, or vice-versa, which in turn are adapted to actuate electrical switches connected in parallel in a circuit for actuating a solenoid operated check valve of a brakeholder mechanism. The valves are arranged to be rotated by the drive of the cable of a speedometer of the motor vehicle in such a manner so that the exhaust valve continuously discharges fluid pressure from the passages when the speedometer cable is rotating thereby preventing fluid pressure from actuating the fluid motors while the vehicle is in motion, and when the speedometer cable has completely stopped rotating, as when the vehicle is stationary and the engine is idling, the control valve is arranged to open any or all the fluid passages to the motors to be actuated by the fluid pressure therein, while the exhaust valve has closed the exhaust port to one or all of said passages, whereby actuation of any or all of the motors will actuate any or all of the switches to the closed position thereby energizing the circuit.

These and other features of the present invention are described in detail below in connection with the accompanying drawings, in which like numerals designate like parts, and in which.

Figure 1:
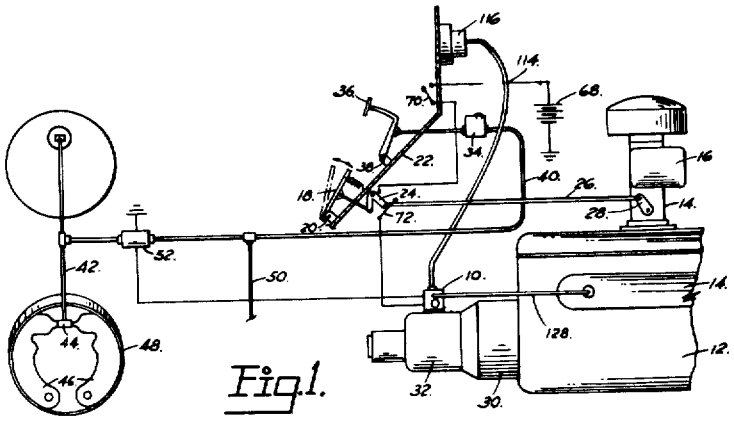
FIGURE 1 is a diagrammatic view of a hydraulic brake system and other parts of a motor vehicle illustrating the application of a control device embodying the present invention in a brakeholder mechanism.

Referring in detail to the drawings, there is shown, as an embodiment of the present invention, a control device as indicated generally at 10, which is employed in a well known type of hydraulic brake system, including a brakeholder, of an automotive vehicle that needs to be considered for an understanding of the present invention. As shown in FIGURE 1, an engine 12 has the usual intake manifold 14 through which fuel is supplied to the engine from a carburetor 16 controlled by a throttle valve, not shown. The throttle valve is actuated by depression of an accelerator pedal 18 pivotally mounted, as at 20, on the vehicle floor, as indicated at 22, and connected to the throttle valve by a bell-crank 24, a linkage rod 26 and lever 28. The crankshaft (not shown) of the engine 12 is connected to vehicle wheels (not shown) by means of a suitable type transmitting connection which includes a fluid coupling 30 and an automatic speed change transmission 32 to which a propeller shaft (not shown) is connected for driving the rear vehicle wheels as is well known in the art.

The braking system of the vehicle, as schematically shown in FIGURE 1, is of a well known hydraulic type and consists of a master cylinder 34 operated by a foot pedal 36 pivoted at 38 to the floor 22 and adapted to force liquid under pressure through conduits 40 and 42 to fluid pressure operated motors 44 of brake shoes 46 which are adapted to be moved into engagement with a brake drum 48 provided in each wheel of the vehicle, of which brake drums only for the rear wheels are shown. Liquid under pressure is also conducted from the master cylinder 34 through a conduit 50 to the braking devices of the front wheels of the vehicle, not shown.

Figure 5:
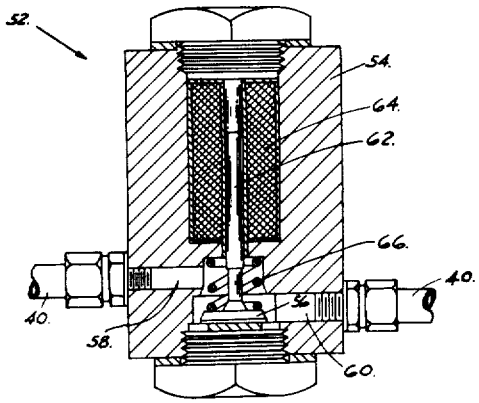
FIGURE 5 is a sectional view of a typical solenoid operated check valve of the brakeholder employed in the braking system shown in FIGURE 1.

The brakeholder, as indicated generally at 52 in FIGURE 1, consisting of a normally open valve of any suitable kind is interposed in the conduit 40 between the master cylinder 34 and the conduit 42 for preferably controlling the brake motors 44 of the rear wheels only for reasons of safety, even though the brakeholder may also be employed to control the brakes of all the wheels. For purposes of illustration, a brakeholder valve unit 52 is shown in FIGURE 5 and consists of a body 54 having a valve 56 slidably mounted therein for controlling the passage of fluid under pressure between inlet and outlet passages 58 and 60, respectively, connected on the master cylinder 34 side and the brake motors 44 side in the conduit 40. A valve stem 62 acts as a magnetic plunger within a solenoid coil 64. Solenoid 64, when energized, will cause valve 56 to move to a closed position against the pressure of a spring 66 tending to hold the valve 56 open for permitting ordinary uses of the braking system. However, when valve 56 is in closed position, fluid under pressure is trapped in the brake motors 44 and this maintains the wheel brakes applied after pressure against the brake pedal 36 has been released and the pedal has returned to its released position.

Figure 2:
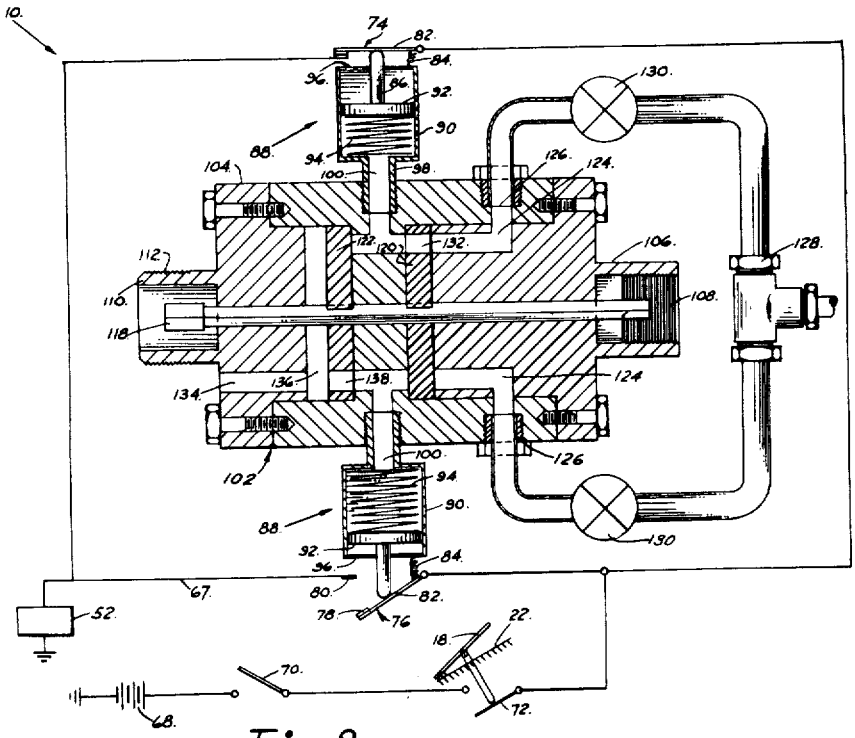
FIGURE 2 is a sectional view of the control device of the present invention shown with electrical switch connections for operating a brakeholder.

As shown in FIGURES 1 and 2, the grounded solenoid coil 64 of the brakeholder unit 52 is connected by a conductor 67 in series with a grounded battery 68, the usual ignition switch 70 of the vehicle, a switch 72 operated by the accelerator pedal 18, and the control device 10 constructed in accordance with the present invention and interposed between the brakeholder 52 and the switch 72. The switch 72 controlled by the accelerator pedal 18 is in the open position when the accelerator pedal 18 is depressed from its released position to any other position for actuating the throttle valve and in closed position when the pedal 18 is in its released position in which position the engine is idling. Closing of the switch 72, however, will not energize the solenoid coil 64 unless either one or both of a pair of switches 74 and 76, respectively, of the control device 10 connected in parallel in the circuit is also in closed position thereby completing the circuit from the battery 68 to the solenoid coil 64.

As shown in FIGURE 2, each of the switches 74 and 76 includes contacts 78 and 80, of which contact 78 is fixed to the outer end of a pivoted finger 82 urged to a closed position by a spring 84. The contacts 78 and 80 of each of the switches 74 and 76 are normally held in open position by a plunger 86 of a fluid pressure actuated motor 88. It should be understood that the switch contacts 78 and 80 may also be held open by the spring 84 and closed by the plunger 86 without departing from the scope of the present invention. The fluid motors 88 may be of the dashpot type each having a cylinder 90 and a piston 92 fixed to the inner end of the plunger 86 which is urged to the extended position by a spring 94. The plunger 86 is actuated by positive or negative pressure, in this instance by negative pressure or vacuum, for overcoming the tension of the spring 94 and to move the plunger 86 inwardly in the cylinder 90, thereby permitting the switch contacts 78 and 80 to come into engagement with each other by the action of the spring 84 on the switch finger 82. An orifice 96 in each cylinder 90 vents to the atmosphere for permitting atmospheric pressure to act on the outer side of the piston 92 of each plunger 86 when negative pressure or vacuum is on the inner side of piston 92. However, any other suitable type of a fluid motor, such as a diaphragm operated plunger, may be employed for actuating the switches 74 and 76 without departing from the scope of the present invention.

Each of the fluid pressure operated motors 88 is connected by a conduit 98 to an outlet passage 100 of a valve control device or unit 102 adapted to control fluid pressure from a source to and from the fluid motors 88. The valve unit 102 comprises a body 104 having at one end a coupling sleeve 106 provided with inner threads 108 for attachment to the speedometer cable take-off on the transmission 32 of the engine 12. At the other end, the valve unit 102 is provided with a coupling sleeve 110 having outer threads 112 for attachment to a conduit 114 of a cable (not shown) of a speedometer of the vehicle, as indicated at 116 in FIGURE 1. A shaft 118 mounted longitudinally in the valve body 104 is adapted to be coupled at one end to the speedometer cable and at the other end to the speedometer cable drive or take-off in the transmission 32 for rotation thereby when the speedometer cable is in rotating motion. A pair of disc-like valves 120 and 122 are mounted, axially spaced apart, on the shaft 118 for rotation therewith. Valve 120, being a fluid pressure control or check valve, is adapted, adjacent to the periphery thereof, to extend transversely through a pair of parallel inlet passages 124 extending longitudinally in the valve body 104 and spaced diametrically apart therein. The inlet passages 124 are each adapted to be connected at an inlet port 126 to the intake manifold 14 of the engine 12 by a conduit 128 having a pair of separate sections adjacent the valve unit 102 for connection to each intake port 126. Thus vacuum or negative pressure from the intake manifold 14 causes differential pressure to be created in each cylinder 90 for drawing the piston 92 and the plunger 86 inwardly thereby permitting the switch contacts 78 and 80 to come into engagement with each other by the action of the spring 84 on the contact finger 82. A needle valve 130 may be provided in each conduit section 128 for metering the fluid pressure therein.

Figure 3:
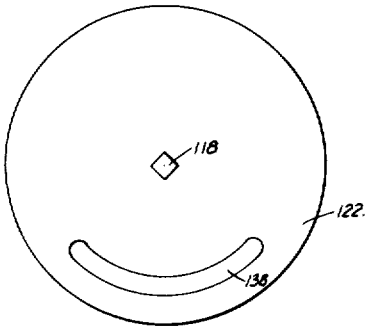
FIGURE 3 is a front view of an exhaust valve employed in the control device as shown in FIGURE 2.
Figure 4:
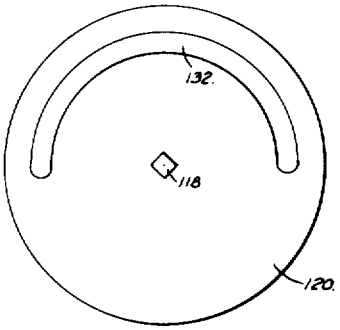
FIGURE 4 is a front view of a fluid pressure control valve employed in the control device as shown in FIGURE 2.

The check valve 120 is located between the inlet ports 126 of each of the inlet passages 124 and the outlet passages 100, which passages 100 extend in the valve body 104 in diametrically opposite directions and transversely to the inlet passages 124 for controlling fluid pressure to and from, or vice versa, the fluid motors 88. Control of the fluid pressure is obtained by the intake valve 120 being formed with an arcuate opening 132, see FIGURE 4, disposed adjacent to the periphery of the disc-like valve 120 and extending for a length of slightly greater than half a circle so as to register with or open in either or both of the inlet passages 124 when stopped rotating. The other disc-like valve 122, see FIGURE 3, being an exhaust valve extends transversely, adjacent to the periphery thereof, through the inlet passages 124 and is located between the outlet passages 100 and an exhaust passage 134 communicating with the inlet passages 124 and with an exhaust port 136 for discharging or venting pressure to the atmosphere as in this instance, or to a reservoir (not shown). As shown in FIGURE 3, the exhaust valve 122 is likewise formed with an arcuate opening 138 disposed adjacent to the periphery thereof and extending for a length much less than half a circle for registering with or opening in any one of the passages 124, but not in both of them at the same time, thereby permitting fluid pressure to drain or vent to the atmosphere from the inlet and outlet passages 124 and 100, respectively, through exhaust port 136. The valve opening 138, however, is disposed diametrically opposite to the opening 132 in valve 120 for registering with the opposite one of the passages 124 which is in registry with the opening 132 of valve 120. It should also be understood that the valves 120 and 122 may be formed as one unit instead of the separate valves.

In operation, when the automotive vehicle is in motion, the accelerator pedal 18 is depressed and switch 72 is open thereby preventing energization of the solenoid coil 64 for closing the brakeholder valve 56. The valve 56 being open permits passage of fluid to and from the brake motors 44 from master cylinder 34 and therefore permits general operation of the brakes of the vehicle. If for any reason the accelerator pedal 86 is released from a depressed position, and as long as the vehicle is in motion, the solenoid coil 64 is still not energized and the valve 56 not closed for both switches 74 and 76 of the control device 10 are open. The switches 74 and 76 stay open as long as the exhaust valve 122 in the valve unit 102 is continuously rotated by the speedometer cable and the exhaust or vent port 134, passages 136, 100 and 124 are all in communication with each other thereby relieving the motors 88 from any fluid pressure which would cause actuation of the plungers 86 therein. The exhaust valve 122 being in rotation causes the opening 138 to continuously connect and disconnect the exhaust passage 136 with the inlet passages 124 and therefore drain the fluid pressure therefrom. However, when the vehicle is not in motion and the engine is idling, the speedometer cable has also stopped rotating and therefore the shaft 118 and the valves 120 and 122. When the valves 120 and 122 have stopped rotating, the opening 132 of check valve 120 has to be in registry with either or both passages 124 thereby permitting positive or negative pressure to actuate the plunger 86 of either or both of the fluid motors 88. The actuation of the plunger 86 of either or both of the fluid motors 88 depends on the position of the opening 138 of the exhaust valve 122. The valve opening 138, when the exhaust valve 122 is stationary, has to be in registry with the exhaust passage 136 and with one of the passages 124, or neither one, in which case, the plunger 86 of one or both of the motors 88 will be actuated and therefore one or both switches 74 and 76 also will be actuated to the closed position. The accelerator switch 72 and one or both of the switches 74 and 76 being thus closed, will cause the solenoid coil 64 to be energized and the brakeholder valve 56 to be closed by the solenoid 64 thereby trapping fluid in the brake motors 44 and thus keeping the brakes applied.

Release of the brakes of the vehicle is automatically obtained by opening the closed switch 72 with depression of the accelerator pedal 18, thereby interrupting the current flow in the circuit and therefore de-energizing the solenoid coil 64 which in turn releases the valve 56 from its closed position by the action of the spring 66. With the brakeholder valve 56 in its open position, the trapped fluid in the brake motors 44 is released and the brake shoes 46 are permitted to return to their normal position.

*From the foregoing description, it is apparent the control device 10 detailed in FIGURE 2 is used with a motor vehicle apparatus for example, that has an actuatable element, such as the brakeholding solenoid operated valve 52, which is subject to actuation when the speedometer cable or like rotatable means of the vehicle stops rotating. The two dashpot type fluid motors 88 are effectively energizable and deenergizable delay means, or variable capacity energy storage means, operable alternately with some overlap of energizing times since the arcuate opening 132 in the intake valve 120 of FIGURE 4 times the energizing operation of each delay or storage means 88 to occur for more than 180° each cycle. Also, the delay or storage means 88 are deenergized alternately, and at times when the other is being energized, in accordance with the relative position and length of the arcuate timing opening 138 in exhaust valve 122. In operation, the rotatable valves 120 and 122 allow charge and discharge of the delay or storage means 88 but prevent, as long as they continue to rotate, either of the means 88 from being charged to their respective limit for closing either switch 74 or 76.*

*As is apparent from FIGURE 2, the lower delay or storage means 88 is discharged since it is in communication with the atmosphere via valve time opening 138 and outlet 134 and not with the suction source through the intake valve 120. On the other hand, and at the same time, the suction source has operated through the timing opening 132 in intake valve 120 to sufficiently charge the upper delay or storage means 88 to close switch 74 since the drive shaft 118 has stopped rotating. As is well known for dashpots, the amount such is charged or discharged is related to the time of the charging or discharging operation. The lengths of the intake and exhaust valve openings 132 and 138 remain constant regardless of the speed the valves are being rotated, but it is apparent the time intervals during which the charging and discharging operations take place varies inversely with the speed or angular velocity of valves 120 and 122. In effect, then, when the valves stop rotating, the time interval for charging one of the delay or storage means 88 via valve intake opening 132 continues to exist until the drive shaft 118 is again rotated. While that time interval exists, the respective delay or storage means is charged to a predetermined limit whereby the associated switch 74 or 76 is closed to cause actuation of the brakeholder 52 during the time the vehicle is stopped.*

From the foregoing description of the present invention, it is readily seen that a brakeholder of a braking system of a motor vehicle may be automatically and effectively operated without interference with the general operation of the vehicle by the provision of the control device of the present invention for preventing creeping of the vehicle when not in motion and when the engine is idling, and for automatically releasing the brakeholder without the need of any means to be operated by the driver of the vehicle.

The present invention has been described in detail above for purposes of illustration only and is not intended to be limited by this description or otherwise, except as defined in the appended claims.

What I claim is:

1. A control device comprising a body having a pair of fluid pressure passages extending longitudinally and spaced diametrically apart in said body for connection to a fluid pressure supply at one end thereof, an exhaust port in said body at the other end of said passages, an intermediate outlet in said body for each of said passages for passage of fluid pressure to and from a fluid pressure operated actuator, a shaft rotatably mounted longitudinally in said body, rotary valve means mounted on said shaft for rotation therewith, said valve means extending transversely through said passages for controlling the fluid pressure therethrough, said valve means having an arcuate opening of a length greater than half a circle for passage of fluid pressure from either or both of said passages to the respective one of said outlets, and said valve means having an exhaust opening disposed diametrically opposite to said arcuate opening for passage of fluid pressure from either one of said passages to said exhaust port, whereby continuous rotation of said shaft causes said valve means to unload fluid pressure through said exhaust opening from said passages, and stopping of rotation of said shaft causes said arcuate opening of said valve means to permit passage of fluid pressure from said passages to and from said outlets.

2. A control device comprising a body having a pair of fluid pressure passages extending longitudinally and spaced diametrically apart in said body for connection to a fluid pressure supply at one end thereof, an exhaust port in said body at the other end of said passages, an intermediate outlet in said body for each of said passages for passage of fluid pressure to and from a fluid pressure operated actuator, a shaft rotatably mounted longitudinally in said body, a pair of disc-like valves mounted axially apart on said shaft for rotation therewith, said valves each extending transversely through said passages for controlling the fluid pressure therethrough, one of said valves having an arcuate opening of a length greater than half a circle for passage of fluid pressure from either or both of said passages to the respective one of said outlets, and the other of said valves having an arcuate opening of a length less than half a circle disposed diametrically opposite to said one valve opening for passage of fluid pressure from either one of said passages to said exhaust port, whereby continuous rotation of said shaft causes said other of said valves to unload fluid pressure from said passages, and stopping of rotation of said shaft causes said one of said valves to permit passage of fluid pressure, to and from said outlets.

3. A control device comprising a body having a pair of longitudinally extending fluid pressure passages disposed diametrically apart and in parallel relation to each other, an inlet port and an exhaust port in said body for said passages, an outlet passage in said body for each of said longitudinal passages, said outlet passages each extending transversely of said longitudinal passages and in diametrically opposite directions from each other for connection to a fluid motor, a shaft rotatably mounted longitudinally in said body, an inner disc-like valve mounted on said shaft for rotation therewith, said inner valve extending transversely through said longitudinal passages between said inlet port and said outlet passages for controlling passage of fluid pressure therethrough, said inner valve having an arcuate opening adjacent to the periphery thereof for registering with either or both of said longitudinal passages for permitting passage of fluid pressure to and from said outlet passages, an outer disc-like valve mounted on said shaft for rotation therewith, said outer valve extending transversely through said longitudinal passages and disposed between said outlet passages and said exhaust port, and said outer valve having an opening disposed diametrically opposite to said inner valve opening for passage of fluid pressure from either or none of said longitudinal passages through said exhaust port while being stationary and from both of said passages while in motion.

4. A control device comprising a body having longitudinally extending parallel fluid pressure passages disposed diametrically opposite to each other and each having an inlet port for connection to a fluid pressure source and a common exhaust port for discharging fluid pressure therefrom, said body having outlet passages extending transversely in said body in diametrically opposite directions and each communicating with one of said longitudinal passages, a fluid pressure operated motor connected to each of said outlet passages for actuation thereof by fluid pressure, a shaft rotatably mounted longitudinally in said body, a check and an exhaust disc-like valve mounted axially apart on said shaft for rotation therewith, said valves extending transversely through said longitudinal passages for controlling fluid pressure therein, said check valve located between said inlet ports and said outlet passages and having an arcuate opening extending adjacent to the periphery thereof for a length greater than half the circumference of said valve for permitting fluid pressure from said longitudinal passages to pass to said outlet passages for actuating said motors, said exhaust valve located between said outlet passages and said exhaust port and having an arcuate opening adjacent the periphery thereof disposed diametrically opposite to and of a lesser length than said check valve opening for connecting both of said longitudinal passages to said exhaust port while in motion and only one of said longitudinal passages when stationary, thereby relieving the fluid pressure from said outlet passages.

5. A control device comprising a body having fluid pressure passages having an inlet port at one end thereof for connection to a fluid pressure source and an exhaust port at the other end thereof for venting to the atmosphere, said body having outlets extending transversely to and each communicating with one of said passages, a shaft mounted for rotation in said body in parallel relation to said passage, a pair of disc-like parallel valves mounted axially apart on said shaft for rotation therewith, one of said valves located between said inlet ports and said outlets and extending transversely through said passages, said one valve having an arcuate opening for passage of fluid therethrough when in registry with said passages, the other of said valves located between said outlets and said exhaust port and having an opening disposed diametrically opposite to said one valve for venting said outlets to the atmosphere through said exhaust port, and fluid pressure operated plungers each connected to one of said outlets for actuation thereof.

6. A control device comprising, fluid operated motors, a valve device connected to a fluid pressure source and to said fluid motors for operation thereof, said valve device having a body provided with fluid pressure passages therein, a valve mounted for rotation in said body for controlling passage of fluid pressure through said passages to and from said fluid motors, said valve having arcuate opening means to permit fluid pressure passage to at least one of said fluid motors while said valve being stationary for actuation of said one of said fluid motors and for preventing passage of fluid pressure to said fluid motors during continuous rotation of said valve thereby preventing actuation of said fluid motors.

7. A brake holding system comprising a brake holder, an electrical circuit for actuating said brake holder, a pair of electrical switches connected in parallel in said circuit for energizing the circuit by actuation of any of said switches, a fluid pressure operated plunger for each of said switches for actuation thereof, a valve control unit having fluid pressure passages for connection to said plungers and to a fluid pressure source for controlling operation of said plungers, valve means rotatably mounted in said valve unit for controlling the fluid pressure in said passages, said valve means having means for connection to a speedometer cable drive for rotation thereby, and said valve means having arcuate opening means adapted to relieve pressure from said passages while in continuous rotation by the speedometer cable drive thereby preventing actuation of said plungers and to connect said passages to said plungers when stopped rotating for causing at least one of said plungers to actuate the respective of said switches for energizing said circuit.

*8. A control device for use with apparatus having an actuatable element which is subject to actuation when rotatable means of the apparatus stops rotating, comprising:*

*(a) a plurality of variable capacity energy storage means each capable of having the quantity of energy it stores changed in either direction at least to predetermined limits in proportion to the amount of time elapsed respectively during charging and discharging thereof for effecting actuation of said element upon being changed to a predetermined storage condition, and*

*(b) means for charging and discharging each of said storage means at least once each revolution of said rotatable means, and including*

*(c) movable means operable in conjunction with said rotatable means for causing at least one of said storage means to be changed to its said predetermined storage condition only when the movable means is stopped.*

*9. A device as in claim 8 wherein said movable means includes means for preventing the charging and discharging means from operating in either of said directions a sufficient length of time to change any of said storage means to its said predetermined storage condition while the said movable means is moving.*

*10. A control device for use with apparatus having an actuatable element which is subject to actuation when rotatable means of the apparatus stops rotating, comprising:*

*(a) first and second energy storage means operable to actuate said element,*

*(b) means for charging and discharging said storage means,*

*(c) means operable in conjunction with said rotatable means for causing at least one cycle of charging and discharging operations to occur for each of said storage means during each revolution of said rotatable means including*

*(d) timing means for causing one of said operations in each said cycle for each storage means to occur for more than one-half of that cycle and the other to occur during the remaining portion of that cycle and for phasing the cycles as between the storage*

*means to effect concurrence of unlike types of said charging and discharging operations,*

*(e) the said one operation of either storage means non-coextensively overlapping that same operation of the other storage means and varying in length of time inversely with the angular velocity of said rotatable means so as to be of sufficient duration only when existing while the rotatable means stops rotating to cause the necessary operation of the respective storage means to effect actuation of said element.*

*11. A control device as in claim 10 wherein said timing means includes first arcuate means extending for an angle substantially greater than 180° to effect said one operation and second arcuate means extending non-overlappingly of the said first arcuate means for an angle substantially less than 180° to effect said other operation.*

*12. A control device as in claim 11 wherein said timing means causes the said one operation to be a charging operation in each cycle for each storage means.*

*13. A brake holding system for use in brakeable equipment having rotatable drive means that stops rotating when said equipment is fully braked, comprising:*

*(a) a brake holder,*

*(b) a plurality of energy storage means each capable of being alternately charged and discharged respectively in successively occurring charging and discharging operating intervals for effecting actuation of said brake holder only if a certain one of said intervals exceeds a predetermined length of time, and*

*(c) means operable in response to rotation and non-rotation of said rotatable drive means for operatively charging and discharging each storage means at least once per revolution of said drive means during respective different length successive charging and discharging operating intervals associated with that storage means and for continuing to operate that storage means during non-rotation of said drive means in the same manner as in the one of said charging and discharging operating intervals existing for that storage means when the said drive means stops,*

*(d) the respective lengths of said different length operating intervals being inversely related to the angular velocity of said drive means and the longer one thereof being the said certain one successive operating interval which must exceed said predetermined length of time to cause its associated storage means to effect actuation of said brake holder,*

*(e) the longer one of said different length intervals associated with any one storage means non-coextensively overlapping the longer such interval associated with another storage means but being less than said predetermined length of time only as long as said rotatable drive means is rotating,*

*(f) whereby when rotation thereof stops at least one of said longer intervals invariably exists to exceed said predetermined time for causing operation of its associated storage means to effect actuation of said brake holder as aforesaid.*

*14. A system as in claim 13 wherein the phrase (c) means includes a rotatable member operable by said drive means and having first arcuate means extending for an angle substantially greater than 180° in the direction of rotation of the rotatable member to effect said certain longer operating intervals and second arcuate means also extending in the direction of rotation of the rotatable member for an angle substantially less than 180° but non-overlappingly of the said first arcuate means to effect the shorter operating intervals.*

*15. A system as in claim 14 wherein the phrase (c) means causes the said longer operating intervals effected by the said first arcuate means to be charging intervals.*

*16. A brake holding system for use in breakeable equipment having rotatable drive means that stops rotating when said equipment is fully braked, comprising:*

*(a) a brake holder,*

*(b) a plurality of energizable and de-energizable time delay means respectively for effecting actuation of said brake holder only after being operated in a certain sense for a respective predetermined elapsed time, and*

*(c) means operable in response to rotation of said rotatable drive means for operating each said delay means alternately in energizing and de-energizing senses during respective different length sequential intervals the longer one of which non-coextensively overlaps the respectively corresponding longer interval for another said delay means,*

*(d) said longer intervals for each delay means being less than said respective predetermined elapsed time as long as said rotatable drive means is rotating but when existing when rotation thereof stops being greater than that time for then invariably effecting operation of the respective delay means in the said certain one of said energizing and de-energizing senses for longer than the said respective predetermined time to effect actuation of said brake holder.*

*17. A brake holding system for use in brakeable equipment having rotatable drive means that stops rotating when said equipment is fully braked, comprising:*

*(a) a brake holder,*

*(b) a plurality of energizable time delay means respectively for effecting actuation of said brake holder only after being energized for a respective predetermined elapsed time, and*

*(c) means operable in response to rotation of said rotatable drive means for causing each said delay means to be alternately energized and de-energized during respective different length sequential intervals the longer one of which non-coextensively overlaps the respectively corresponding longer interval for another said delay means,*

*(d) said longer intervals for each delay means being less than said predetermined elapsed time as long as said rotatable drive means is rotating but when existing while rotation thereof stops being greater than that time for then invariably energizing at least one of said delay means for at least said predetermined time to effect actuation of said brake holder.*

References Cited in the file of this patent or the original patent

UNITED STATES PATENTS

| | | |
|---|---|---|
| 1,921,380 | Barker | Aug. 8, 1933 |
| 2,577,680 | Harman et al. | Dec. 4, 1951 |
| 2,637,416 | Gurnsey et al. | May 5, 1953 |
| 2,800,284 | Weber et al. | July 23, 1957 |
| 2,872,541 | Oppenheim et al. | Feb. 3, 1959 |
| 2,878,786 | Vuillemin | Mar. 24, 1959 |